United States Patent
Izumi

(10) Patent No.: US 11,648,689 B2
(45) Date of Patent: May 16, 2023

(54) GRIPPING MECHANISM AND ASSEMBLY APPARATUS

(71) Applicant: KYOCERA Document Solutions Inc., Osaka (JP)

(72) Inventor: Koji Izumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 51 days.

(21) Appl. No.: 16/918,544

(22) Filed: Jul. 1, 2020

(65) Prior Publication Data
US 2021/0001497 A1    Jan. 7, 2021

(30) Foreign Application Priority Data
Jul. 2, 2019  (JP) .............................. JP2019-123714

(51) Int. Cl.
  B25J 15/08    (2006.01)
  B25J 15/00    (2006.01)
  B25J 9/02     (2006.01)

(52) U.S. Cl.
  CPC ....... B25J 15/0033 (2013.01); B25J 15/0028 (2013.01); B25J 15/08 (2013.01); B25J 9/023 (2013.01)

(58) Field of Classification Search
  CPC .................................. B66C 1/442; B66C 1/48
  USPC ....... 294/86.25, 86.3, 94, 101, 102.1, 103.1, 294/116, 197
  See application file for complete search history.

(56) References Cited

U.S. PATENT DOCUMENTS

| | | | | |
|---|---|---|---|---|
| 225,517 A | * | 3/1880 | Gilman | F16L 3/233 24/171 |
| 3,780,923 A | * | 12/1973 | Merola | B65G 15/00 74/25 |
| 3,797,725 A | * | 3/1974 | Mori | B23K 3/08 228/41 |
| 4,085,848 A | * | 4/1978 | Tsuge | B42F 15/066 211/89.01 |
| 4,197,886 A | | 4/1980 | MacDonald | |
| 9,884,708 B2 | * | 2/2018 | Cole | B65D 63/1027 |

(Continued)

FOREIGN PATENT DOCUMENTS

| | | |
|---|---|---|
| JP | S53-087818 A | 8/1978 |
| JP | S54-040400 A | 3/1979 |
| JP | S56-152240 A | 11/1981 |

(Continued)

OTHER PUBLICATIONS

An Office Action; "Notice of Reasons for Refusal," mailed by the Japanese Patent Office dated Mar. 22, 2023, which corresponds to Japanese Patent Application No. 2019-123714 and is related to U.S. Appl. No. 16/918,544; with English language translation.

*Primary Examiner* — Saul Rodriguez
*Assistant Examiner* — Brendan P Tighe
(74) *Attorney, Agent, or Firm* — Studebaker & Brackett PC

(57) ABSTRACT

A gripping mechanism includes a frame and two or more spheres. The frame houses the two or more spheres. At least two spheres of the two or more spheres grip an object. Preferably, the frame includes two or more side plates. The number of the two or more side plates is the same as the number of the two or more spheres. Each of the two or more side plates is inclined toward a center axis of the frame. Each of the two or more spheres is in contact with at least one side plate of the two or more side plates.

5 Claims, 5 Drawing Sheets

(56) References Cited

U.S. PATENT DOCUMENTS 10,093,465 B2 * 10/2018 Rufty ..................... F16B 2/08

FOREIGN PATENT DOCUMENTS

| JP | S59-176772 U | 11/1984 |
| JP | H03-096452 U | 10/1991 |
| JP | H07241733 A | 9/1995 |

* cited by examiner

GRIPPING MECHANISM AND ASSEMBLY APPARATUS

INCORPORATION BY REFERENCE

The present application claims priority under 35 U.S.C. § 119 to Japanese Patent Application No. 2019-123714, filed on Jul. 2, 2019. The contents of this application are incorporated herein by reference in their entirety.

BACKGROUND

The present disclosure relates to a gripping mechanism and an assembly apparatus.

An assembly apparatus includes a chuck mechanism that grips a component to be conveyed. The chuck mechanism is an electric gripping mechanism. There are other known gripping mechanisms that use air suction or electric suction.

SUMMARY

A gripping mechanism according to an aspect of the present disclosure includes two or more spheres and a frame. The frame houses the two or more spheres. At least two spheres of the two or more spheres grip an object.

An assembly apparatus according to an aspect of the present disclosure includes the gripping mechanism and a drive mechanism that moves the gripping mechanism relative to the object.

DETAILED DESCRIPTION

Figure 1:
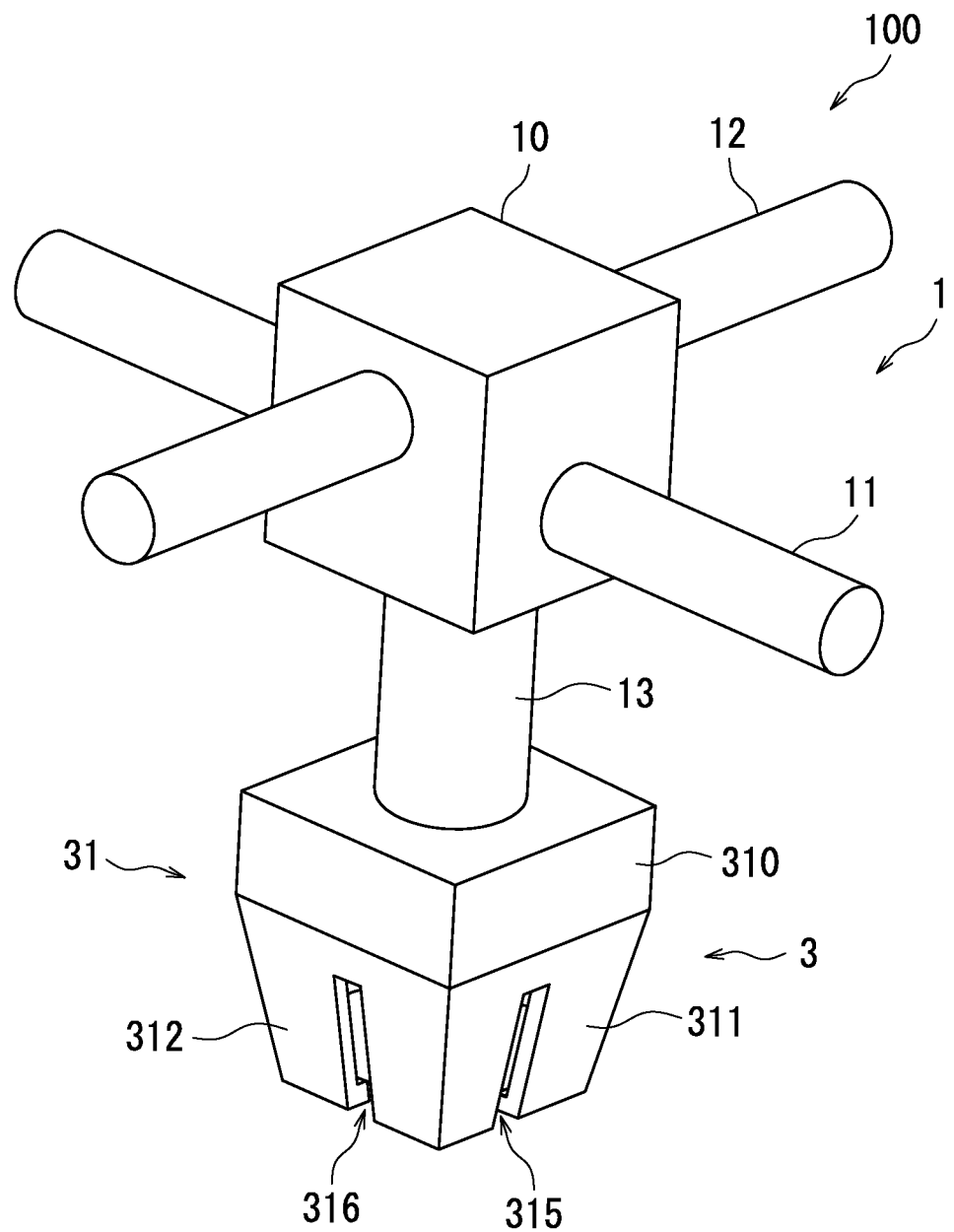
FIG. 1 is a perspective view of an exemplary assembly apparatus according to an embodiment of the present disclosure.
Figure 1:
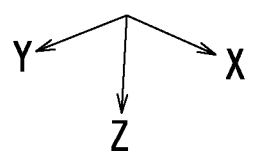

An embodiment of the present disclosure will hereinafter be described with reference to FIGS. 1 to 5. In FIG. 1, as a matter of convenience, mutually perpendicular X and Y axes are in a horizontal plane, and a positive direction of the Z axis corresponds to a vertically downward direction. Elements that are the same or equivalent are labelled with the same reference signs in the drawings and description thereof is not repeated.

An assembly apparatus 100 according to the embodiment of the present disclosure will first be described with reference to FIG. 1. FIG. 1 depicts an example of the assembly apparatus 100.

As illustrated in FIG. 1, the assembly apparatus 100 includes an activation mechanism 1 and a gripping mechanism 3. The activation mechanism 1 includes a drive section 10, a first shaft 11, a second shaft 12, and a third shaft 13. Here, the activation mechanism 1 moves the gripping mechanism 3. The first shaft 11 penetrates the drive section 10 in a direction of the X axis. The second shaft 12 penetrates the drive section 10 in a direction of the Y axis. The third shaft 13 protrudes from the drive section 10 in the positive direction of the Z axis. The gripping mechanism 3 is fixed to a tip end of the third shaft 13.

The drive section 10 and the second shaft 12 are driven by an unillustrated first mechanism, thereby translationally moving in the direction of the X axis along the first shaft 11. In addition, the drive section 10 and the first shaft 11 are driven by an unillustrated second mechanism, thereby translationally moving in the direction of the Y axis along the second shaft 12. This enables the gripping mechanism 3 to move in the XY-plane. Further, the drive section 10 changes a protruding length of the third shaft 13. This enables the gripping mechanism 3 to also move in a direction of the Z axis. The gripping mechanism 3 is however prohibited from rotating on a center axis thereof in the direction of the Z axis.

Figure 2:
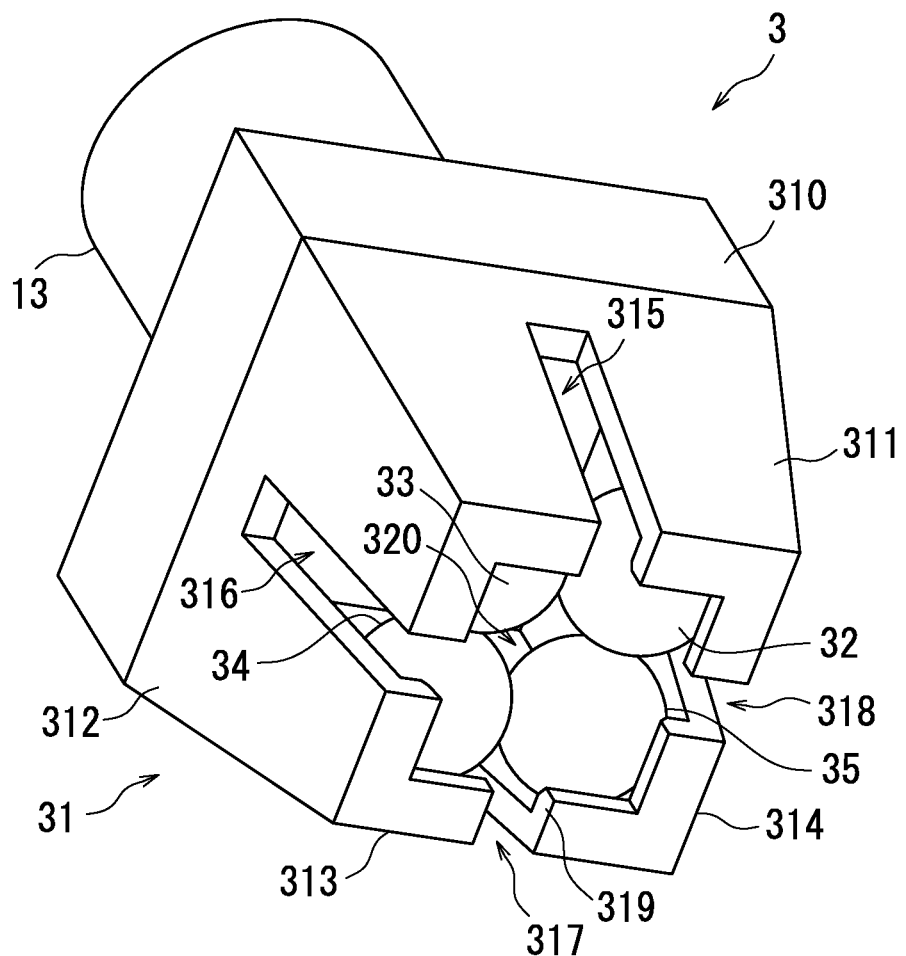
FIG. 2 is a perspective view of an exemplary gripping mechanism according to the embodiment.

The gripping mechanism 3 will next be described with reference to FIGS. 1 and 2. FIG. 2 is a perspective view of the exemplary gripping mechanism 3.

As illustrated in FIG. 2, the gripping mechanism 3 includes a holder 31, a first sphere 32, a second sphere 33, a third sphere 34, and a fourth sphere 35. The holder 31 houses the first to fourth spheres 32 to 35. The holder 31 corresponds to one example of a "frame". The first to fourth spheres 32 to 35 correspond to one example of "two or more spheres".

The holder 31 includes a base 310, a first side plate 311, a second side plate 312, a third side plate 313, a fourth side plate 314, and a bottom plate 319. For example, the holder 31 is made of a light metal such as aluminum. The first to fourth side plates 311 to 314 correspond to one example of "two or more side plates".

The base 310 has a box shape of a rectangular cuboid. An end face of the base 310 in a negative direction of the Z axis is fixed to the third shaft 13. The base 310 has an opening in an end thereof in the positive direction of the Z axis. Here, the opening is substantially square in shape. The opening is communicated with a space surrounded by the first to fourth side plates 311 to 314. The first to fourth side plates 311 to 314 are almost identical in dimensions and each of them has a trapezoid plate. The bottom plate 319 is substantially square in outline and partly closes the space surrounded by the first to fourth side plates 311 to 314. The length of one side of the bottom plate 319 is shorter than the length of one side of the opening of the base 310. The first to fourth side plates 311 to 314 are inclined toward a center axis of the holder 31.

The bottom plate 319 has an opening 320 that allows an object to be gripped—a gripping target to pass therethrough without allowing the first to fourth spheres 32 to 35 to pass therethrough. The opening 320 is substantially square in shape and formed in a central portion of the bottom plate 319. The first side plate 311 and the bottom plate 319 have a first cut 315 that allows the gripping target to pass therethrough without allowing the first to fourth spheres 32 to 35 to pass therethrough. The second side plate 312 and the bottom plate 319 have a second cut 316 that allows the gripping target to pass therethrough without allowing the first to fourth spheres 32 to 35 to pass therethrough. The third side plate 313 and the bottom plate 319 have a third cut 317 that allows the gripping target to pass therethrough without allowing the first to fourth spheres 32 to 35 to pass therethrough. The fourth side plate 314 and the bottom plate 319 have a fourth cut 318 that allows the gripping target to pass therethrough without allowing the first to fourth spheres 32 to 35 to pass therethrough.

Respective diameters of the first to fourth spheres 32 to 35 are almost equal to each other. The first to fourth spheres 32 to 35 are arranged with their respective centers located at vertices of a substantial square.

FIG. 2 depicts the gripping mechanism 3 not gripping the gripping target. In this state, the first sphere 32 is in contact with the second and fourth spheres 33 and 35. The second sphere 33 is in contact with the third and first spheres 34 and 32. The third sphere 34 is in contact with the fourth and second spheres 35 and 33. The fourth sphere 35 is in contact with the first and third spheres 32 and 34.

In addition, the first sphere 32 is in contact with respective inner surfaces of the first and fourth side plates 311 and 314. The second sphere 33 is in contact with respective inner surfaces of the second and first side plates 312 and 311. The third sphere 34 is in contact with respective inner surfaces of the third and second side plates 313 and 312. The fourth sphere 35 is in contact with respective inner surfaces of the fourth and third side plates 314 and 313.

Each of the first to fourth spheres 32 to 35 has for example a spherical core, and a coating covering the surface of the core. The core is made of metal such as iron. The coating is elastic and is made from material such as polyacetal resin. Density of the core is greater than density of the coating. The coating is deformable in a compressive manner. The friction coefficient of the surface of the coating is greater than the friction coefficient of the surface of the core.

Figure 3:
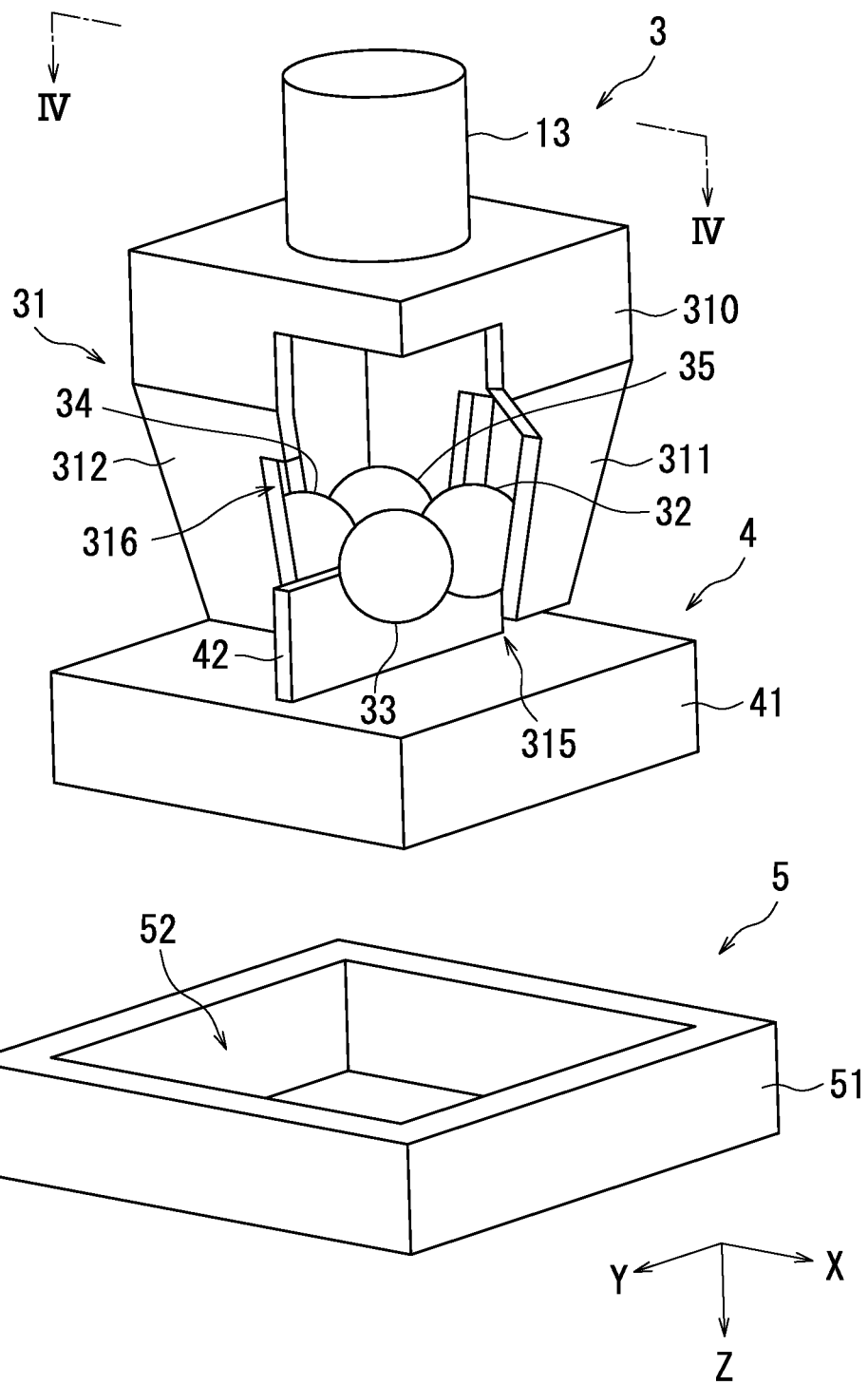
FIG. 3 is a perspective view of the gripping mechanism and the like with part of a holder thereof broken in order to illustrate an operation of the gripping mechanism.
Figure 4:
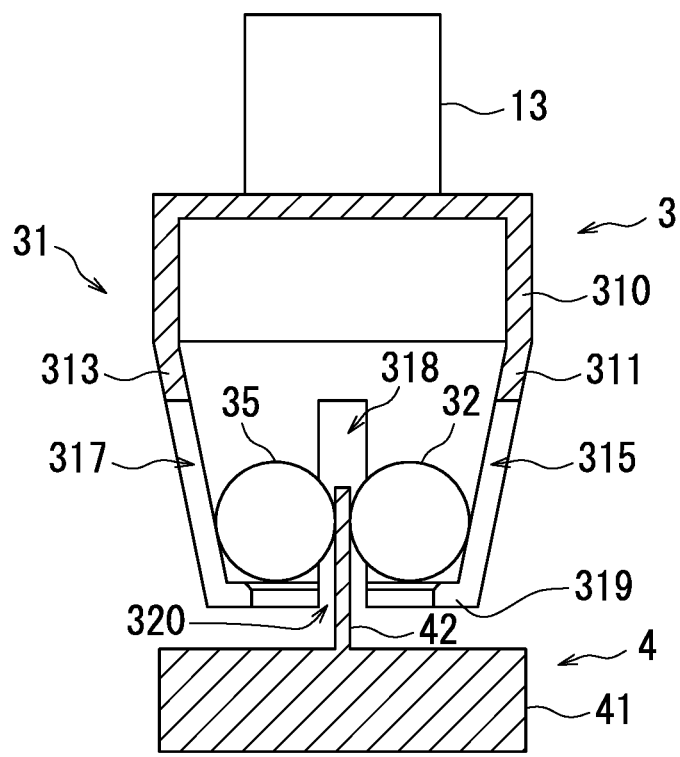
FIG. 4 is a cross-sectional view of the gripping mechanism and the like taken along a line IV-IV of FIG. 3.

An operation of the gripping mechanism 3 will next be described with reference to FIGS. 1 and 4. FIG. 3 is a perspective view of the gripping mechanism 3 and the like with part of the holder 31 broken in order to illustrate the operation of the gripping mechanism 3. FIG. 4 is a cross-sectional view of the gripping mechanism 3 and the like taken along a line IV-IV of FIG. 3.

The assembly apparatus 100 is an apparatus that fits a first component 4 and a second component 5 together by fitting the first component 4 in the second component 5. As illustrated in FIG. 3, the first component 4 includes a first component body 41 and a first gripped portion 42. The first component body 41 is rectangular cuboid in shape. The first gripped portion 42 protrudes from the first component body 41 so as to be easily gripped by the gripping mechanism 3. The first gripped portion 42 is a rectangular plate extending in the YZ-plane. An end face of the first gripped portion 42 is connected to one main surface of the first component body 41.

The second component 5 is constituted by forming a recess 52 in a second component body 51. Here, the second component body 51 is rectangular cuboid in shape. The recess 52 allows the first component body 41 to be fitted therein.

As illustrated in FIGS. 3 and 4, the gripping mechanism 3 grips the first gripped portion 42 between the first and fourth spheres 32 and 35 and between the second and third spheres 33 and 34 by the force of gravity acting on the first to fourth spheres 32 to 35.

Therefore, in a first assembly process, the drive section 10 moves the gripping mechanism 3 in the positive direction of the Z axis relative to the first component 4 to a storage location of the first component 4. The first gripped portion 42 is inserted into the holder 31 through the opening 320 and the second cut 316 and rises in the holder 31 while pushing away the first to fourth spheres 32 to 35. The gripping mechanism 3 stops moving when an upper end of the first gripped portion 42 reaches a position higher than center positions of the first to fourth spheres 32 to 35. Thus, a gripping state depicted in FIGS. 3 and 4 is realized.

In a second assembly process, the gripping mechanism 3 moves in the negative direction of the Z axis, and then conveys the first component 4 to a position immediately above the second component 5 as illustrated in FIG. 3. The first gripped portion 42 remains gripped by the gripping mechanism 3.

In a third assembly process, the gripping mechanism 3 moves in the positive direction of the Z axis. The first component 4 is accordingly fitted in the second component 5. The gripping state depicted in FIG. 3 is maintained at least until immediately before the first component 4 is fitted in the second component 5.

In a fourth assembly process, the gripping mechanism 3 moves in a negative direction of the Y axis. The first gripped portion 42 slips through between the first and fourth spheres 32 and 35 and between the second and third spheres 33 and 34, and then passes through the second cut 316. Thus, the gripping of the first gripped portion 42 is released. The first component 4 remains fitted in the second component 5.

In a fifth assembly process, the gripping mechanism 3 moves in the negative direction of the Z axis, and then returns to an original position in preparation for the next operation.

Figure 5:
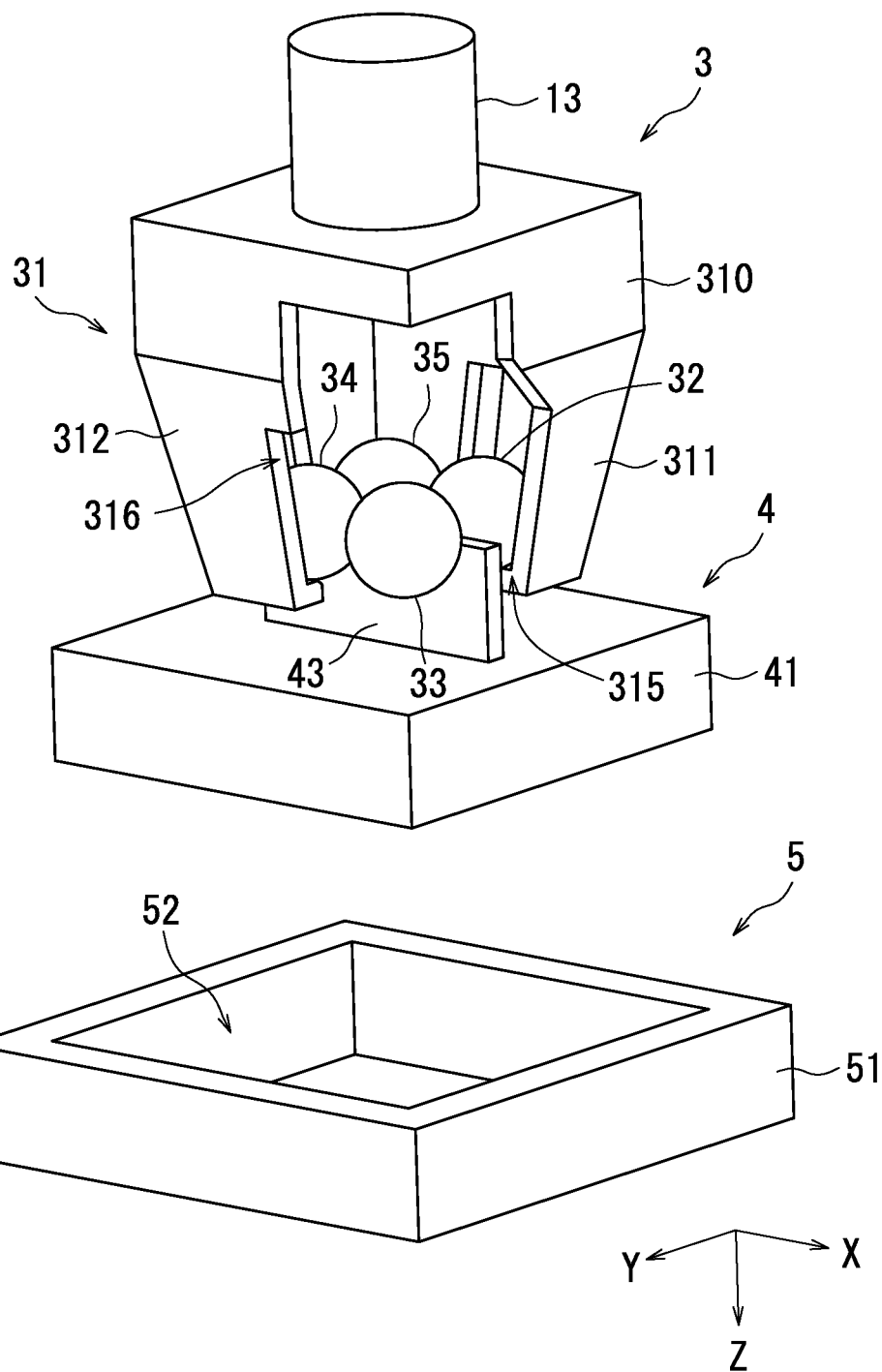
FIG. 5 is a perspective view of the gripping mechanism and the like with part of the holder broken in order to illustrate a different operation of the gripping mechanism.

A different operation of the gripping mechanism 3 will next be described with reference to FIGS. 1 to 3 and 5. FIG. 5 is a perspective view of the gripping mechanism 3 and the like with part of the holder 31 broken in order to illustrate the different operation of the gripping mechanism 3.

The first component 4 depicted in FIG. 5 differs from the first component 4 depicted in FIG. 3 in that the first component 4 depicted in FIG. 5 has a second gripped portion 43. The second gripped portion 43 is a rectangular plate extending in the ZX-plane.

As illustrated in FIG. 5, the gripping mechanism 3 grips the second gripped portion 43 between the first and second spheres 32 and 33 and between third and fourth spheres 34 and 35 by the force of gravity acting on the first to fourth spheres 32 to 35.

Therefore, in a first assembly process, the drive section 10 moves the gripping mechanism 3 in the positive direction of the Z axis relative to the first component 4 to the storage location of the first component 4. The second gripped portion 43 is inserted into the holder 31 through the opening 320 and the first cut 315 and rises in the holder 31 while pushing away the first to fourth spheres 32 to 35. The gripping mechanism 3 stops moving when an upper end of the second gripped portion 43 reaches a position higher than center positions of the first to fourth spheres 32 to 35. Thus, the gripping state depicted in FIG. 5 is realized.

In a second assembly process, the gripping mechanism 3 moves in the negative direction of the Z axis, and then conveys the first component 4 to a position immediately above the second component 5 as illustrated in FIG. 5. The second gripped portion 43 remains gripped by the gripping mechanism 3.

In a third assembly process, the gripping mechanism 3 moves in the positive direction of the Z axis. The first component 4 is accordingly fitted in the second component 5. The gripping state depicted in FIG. 5 is maintained at least until immediately before the first component 4 is fitted in the second component 5.

In a fourth assembly process, the gripping mechanism 3 moves in the negative direction of the X axis. The second gripped portion 43 slips through between the third and fourth spheres 34 and 35 and between the first and second spheres 32 and 33, and then passes through the first cut 315.

Thus, the gripping of the second gripped portion 43 is released. The first component 4 remains fitted in the second component 5.

In a fifth assembly process, the gripping mechanism 3 moves in the negative direction of the Z axis, and then returns to the original position in preparation for the next operation.

According to the embodiment, only the holder 31 and the first to fourth spheres 32 to 35 constitute the gripping mechanism 3 that does not require power as illustrated in FIG. 2. Thus, the gripping mechanism 3 that is inexpensive and less likely to fail is realized.

Also according to the embodiment as illustrated in FIG. 2, each of the first to fourth spheres 32 to 35 is in contact with two adjoining spheres of the first to fourth spheres 32 to 35 in a state where the gripping target is not gripped. As a result, even when each of the first and second gripped portions 42 and 43 is a thin plate, the gripping mechanism 3 that is capable of performing securely gripping is realized.

The description of the above embodiment may include various technically preferable limitations in order to describe a preferred embodiment in the present disclosure. However, the technical scope of the present disclosure is not limited to the embodiment unless otherwise specified by descriptions limiting the present disclosure. That is, the constituent elements in the above-described embodiments can be appropriately replaced with existing constituent elements or the like and various variations are possible, including combinations with other existing constituent elements. The descriptions of the embodiment are not intended to limit content of the disclosure described in the scope of claims.

For example, although the number of spheres is four as illustrated in FIG. 2 in the embodiment, the present disclosure is not limited to this. The number of spheres need only be two or more. Here, at least two spheres of the two or more spheres grip the gripping target. The holder 31 correspondingly has two or more side plates. The number of the two or more side plates is the same as the number of the two or more spheres. Each of the two or more side plates is inclined toward the center axis of the holder 31. Each of the two or more spheres is in contact with at least one side plate of the two or more side plates.

The number of spheres may be three or more. In the case where the gripping mechanism 3 includes three or more spheres, the operation of the gripping mechanism 3 is possible by selecting one of the gripped portions in multiple directions illustrated in FIGS. 3 and 5.

Although the gripping mechanism 3 is prohibited from rotating on the center axis in the direction of the Z axis as illustrated in FIG. 1 in the embodiment, the present disclosure is not limited to this. The drive mechanism may be configured to arbitrarily move the gripping mechanism 3 relative to the gripping target, which includes rotating the gripping mechanism 3.

What is claimed is:

1. A gripping mechanism comprising
two or more spheres each including a core made of metal and a coating that is elastic and that covers a surface of the metal core, and
a frame that houses the two or more spheres, wherein
at least two spheres of the two or more spheres grip an object by force of gravity acting on the at least two spheres, the object being plate shaped,
the two or more spheres are four spheres,
respective diameters of the four spheres are identical to each other, the four spheres being arranged with respective centers of the four spheres located at vertices of a square, and
each of the four spheres is in contact with two adjoining spheres of the four spheres in a state where the object is not gripped.

2. The gripping mechanism according to claim 1, wherein
the frame includes two or more side plates,
a number of the two or more side plates is the same as a number of the two or more spheres,
each of the two or more side plates is inclined toward a center axis of the frame, and
each of the two or more spheres is in contact with at least one side plate of the two or more side plates.

3. The gripping mechanism according to claim 2, wherein
Each of the two or more side plates has a cut that allows the object to pass therethrough without allowing the two or more spheres to pass therethrough.

4. The gripping mechanism according to claim 1, wherein
the frame includes a bottom plate, and
the bottom plate has an opening that allows the object to pass therethrough without allowing the two or more spheres to pass therethrough.

5. An assembly apparatus comprising
the gripping mechanism according to claim 1, and
a drive mechanism configured to move the gripping mechanism relative to the object.

* * * * *